Aug. 7, 1923.
S. KUNO
1,464,205
DIRIGIBLE BUMPER AND HEADLIGHT FOR AUTOMOBILES
Filed Dec. 30, 1922
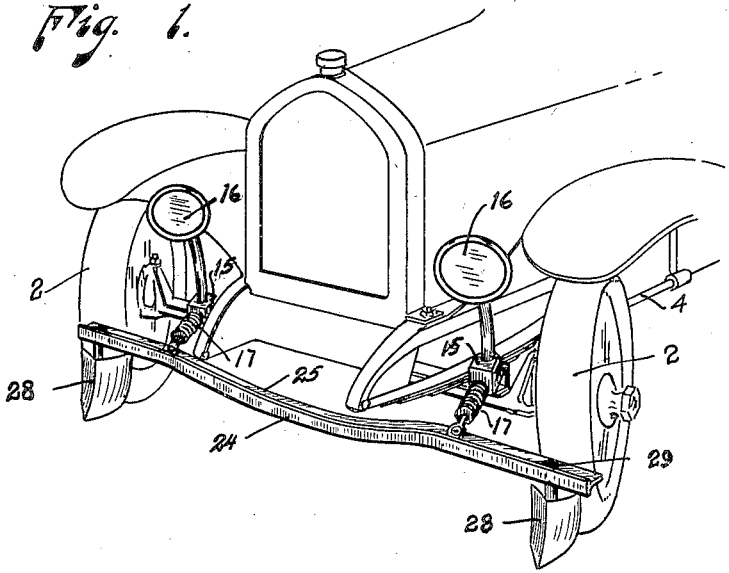
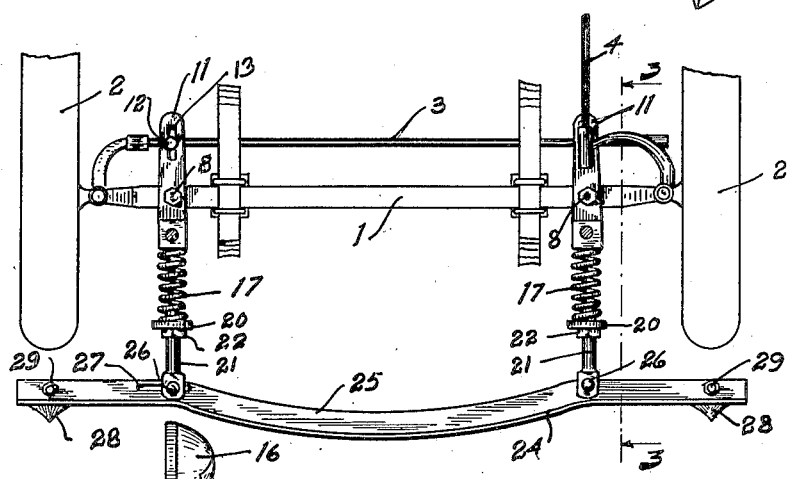
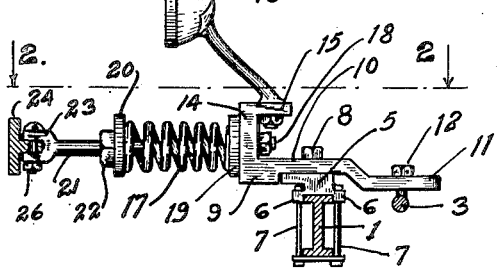
Inventor
Shichigoro Kuno.
By A. J. O'Brien
Attorney Patented Aug. 7, 1923.

1,464,205

UNITED STATES PATENT OFFICE.

SHICHIGORO KUNO, OF DENVER, COLORADO.

DIRIGIBLE BUMPER AND HEADLIGHT FOR AUTOMOBILES.

Application filed December 30, 1922. Serial No. 609,851.

*To all whom it may concern:*

Be it known that I, SHICHIGORO KUNO, a subject of the Emperor of Japan, residing at Denver, in the city and county of Denver and State of Colorado, have invented certain new and useful Improvements in Dirigible Bumpers and Headlights for Automobiles; and I do declare the following to be a full, clear, and exact description of the invention such as will enable others skilled in the art to which it appertains to make and use the same, reference being had to the accompanying drawings and to the characters of reference marked thereon, which form a part of this specification.

This invention relates to automobile bumpers and headlights for automobiles.

It is the object of this invention to devise a new method of mounting the bumpers and the headlights on an automobile so that they will move in accordance with the movement of the front wheels in order that the light will always be projected in the direction in which the car is moving. By making the bumper movable I insure protection for the front wheels at all times without the necessity of employing an excessively long bumper.

It is a further object of this invention to so construct and mount the front bumper that I can attach a small snow plow in front of each front wheel whenever the snow is deep, the bumper being movable in unison with the wheels so that the snow plows will always remain directly in front of the wheels.

It has been found by experience that it is desirable to have automobiles equipped with bumpers, as by this means damage to the machine is largely prevented. On account of the fact that the front wheels turn from side to side, a bumper, in order to render proper protection at all times, must project a considerable distance to each side of the machine. By mounting the bumpers in the manner hereinafter described, the bumper can be made much shorter.

It has long been recognized that much better results can be obtained from the headlights if they are so mounted that they will turn with the front wheels in order that the light shall always be projected in the direction in which the car is moving. I am aware that many patents have been granted for dirigible headlights and I do not claim to be the inventor of this, but only of the idea of mounting the headlights on a dirigible bumper.

An automobile is not well adapted to travel through deep snow, especially if the latter is drifted or packed hard. I have found that if a small shovel or snow plow is mounted directly in front of the front wheels the snow will be broken up and removed from the path of the wheels and that the machine will then have no difficulty in traveling through snow drifts that would otherwise be impossible. My dirigible bumper is admirably adapted as a support or mounting for the snow plows or shovels, as it permits the latter to move with the wheels so as to be always in front of them.

In order to better and more clearly describe my invention, I shall have reference to the accompanying drawings, in which:

Fig. 1 is a perspective view of the front end of an automobile to which my invention has been applied.

Fig. 2 is a section taken on line 2—2, Fig. 3, and shows the manner in which the bumper is attached to the axle and to the steering gear; and Fig. 3 is a view taken on line 3—3, Fig. 2.

The same reference numbers will be used to designate the same parts throughout the several views.

Numeral 1 represents the front axle of an automobile, to the ends of which the wheels 2 are attached in the usual manner, and 3 denotes the tie-rod which is part of the steering gear and which serves to move the wheels from right to left when the rod 4 is reciprocated in the usual way by rotating the steering wheel. I claim nothing new in the steering gear and the above explanation is given merely to enable the parts to be identified.

I clamp to each end of axle 1 a casting 5 (Fig. 3) which has outwardly extending ears 6 for the reception of the clamping bolts 7. The upper surface of casting 5 is flat and has a threaded opening for the reception of bolt 8 which serves as the pivot upon which the bumper-supporting bracket 9 is mounted. Bracket 9 may be made of malleable iron or any other suitable material and has a flattened central portion 10 which cooperates with the flattened top of casting 5 so as to swing thereon about the pivot 8. The rear end 11 of bracket 9 extends rearwardly a sufficient distance to enable it to be attached to the tie-rod 3 by some suitable means such as a bolt 12. I preferably provide the rearwardly extending portion 11 with a slot 13 so as to adapt the bracket to be attached to different makes of cars. It is evident that when the brackets 9 are attached to the axle and tie-rod in the manner described, that they will be moved about their pivots 8 whenever the tie-rod 3 is moved. The front end of each bracket 9 has an upwardly extending portion 14 and a rearwardly extending horizontal portion 15, to which the headlight 16 is attached, in the manner plainly shown in Fig. 3. To the front vertical portion 14 I attach the end of a stiff helical spring 17 by means comprising a bolt 18 and a plate 19 to which the spring may be welded. To the front end of spring 17 I weld another plate 20 which serves to receive and cooperate with the threaded end of a bolt 21 which is held against rotation by means of a lock nut 22. The front end of bolt 21 is forked in the manner indicated at 23 (Fig. 3).

The bumper 24 is preferably formed from a bar of T iron bent into the desired shape. The central web 25 fits in between the forked ends of bolts 21 in the manner shown in Fig. 3 and is secured to the bolts by means of a bolt or rivet 26 in such a manner that it is pivotally movable thereon. One end of the bumper may be provided with a slot 27 for the reception of bolt 26, as by so doing the bumper can be more readily attached to different makes of cars.

It is now evident that the bumper 24 will move in accordance with the movement of the tie-rod 3 and the wheels 2 so that it will always occupy the same relative position with respect to the latter, also that the headlights 16 will move so that they will always point in the same direction as the wheels 2.

If the driver gets caught in a snow storm he can attach the shovels 28 to the web 25 of the bumper 24 by means of bolts 29 and proceed on his way, as the shovels will cut a path for the wheels which will enable the automobile to travel through both deep and drifted snow.

It is evident from the above description that I have invented a combination of a dirigible headlight and bumper that also makes it possible to attach snow plows whenever occasion requires.

I desire to call attention at this point to the coaction between the headlights, bumper and snow plows, the former directing the light in the proper direction and the bumper serving to maintain the snow plows in front of the wheels, regardless of the direction in which the car moves.

Having now described my invention, what I claim is:

1. In combination an automobile axle, a pair of wheels attached thereto, means for changing the angular relation of the planes of the wheels and the axis of the axle, a bumper pivotally attached to the axle, means comprising a portion of the steering gear for moving the bumper in accordance with the movement of the plane of the wheels, with respect to the axle, and a snow plow secured to each end of the bumper directly in front of each wheel.

2. In combination an automobile axle, a wheel attached to each end thereof, means for simultaneously changing the angular relation between the planes of the wheels and the axis of the axle, a bracket pivotally secured near each end of the axle, a coil spring secured to the front end of each bracket, a bumper-bar pivotally connected to the front end of each spring, and means for moving said brackets in accordance with the movement of the wheel planes.

3. In combination an automobile axle, a wheel attached to each end thereof, means for simultaneously changing the angular relation between the planes of the wheels and the axis of the axle, a bracket pivotally secured near each end of the axle, a coil spring secured to the front end of each bracket, a bolt having a forked end secured to the front of each spring, a bumper-bar pivotally secured to the forked ends of said bolts, and means for moving said brackets and bar in accordance with the movement of the wheel planes.

4. An axle, a wheel attached to each end thereof in such manner that the angular relation of the planes of said wheels can be altered with respect to the axis of the axle, means for simultaneously moving said wheels, said means comprising a tie-rod, a bracket pivotally attached near each end of the axle, the rear end of each bracket being pivotally connected to said tie-rod, a coil spring connected to the front end of each bracket and a bumper-bar pivotally connected to the front end of each spring.

In testimony whereof I affix my signature.

SHICHIGORO KUNO.